(12) United States Patent
Fukuda et al.

(10) Patent No.: US 6,937,255 B2
(45) Date of Patent: Aug. 30, 2005

(54) IMAGING APPARATUS AND METHOD OF THE SAME

(75) Inventors: Shuichi Fukuda, Tokyo (JP); Hideyoshi Yanagisawa, Tokyo (JP); Manabu Ishii, Tokyo (JP)

(73) Assignee: Tama-TLO, Ltd., Tokyo (JP)

( * ) Notice: Subject to any disclaimer, the term of this patent is extended or adjusted under 35 U.S.C. 154(b) by 72 days.

(21) Appl. No.: 10/442,192

(22) Filed: May 21, 2003

(65) Prior Publication Data

US 2004/0183926 A1 Sep. 23, 2004

(30) Foreign Application Priority Data

Mar. 20, 2003 (JP) ........................................ 2003-077375

(51) Int. Cl.⁷ ........................... G09G 5/00; H04N 5/225; H04N 5/445; H04N 9/74; H04N 9/76
(52) U.S. Cl. ........................ 345/633; 348/596; 348/601; 348/563; 348/169; 382/103
(58) Field of Search ................................. 345/632–633; 348/580–601, 563, 169, 69, 172; 382/103

(56) References Cited

U.S. PATENT DOCUMENTS

| | | | | |
|---|---|---|---|---|
| 6,166,744 A | * | 12/2000 | Jaszlics et al. | 345/629 |
| 2002/0075286 A1 | * | 6/2002 | Yonezawa et al. | 345/679 |
| 2002/0196343 A1 | * | 12/2002 | Navab et al. | 348/169 |
| 2003/0014423 A1 | * | 1/2003 | Chuah et al. | 707/102 |
| 2003/0030752 A1 | * | 2/2003 | Begeja et al. | 348/563 |
| 2003/0202158 A1 | * | 10/2003 | Fukaya et al. | 353/25 |
| 2003/0227542 A1 | * | 12/2003 | Zhang et al. | 348/61 |
| 2004/0028258 A1 | * | 2/2004 | Naimark et al. | 382/103 |
| 2004/0131232 A1 | * | 7/2004 | Meisner et al. | 382/103 |

FOREIGN PATENT DOCUMENTS

| | | |
|---|---|---|
| JP | 2000-98300 | 4/2000 |
| JP | 2000-98870 | 4/2000 |
| JP | 2000-98871 | 4/2000 |

OTHER PUBLICATIONS

Simon Prince; Adrian David Cheok; Farzam Farbiz; Todd Williamson; Nik Johnson; Mark Billinghurst; Hirokazu Kato. "3–D Live: real time interaction for mixed reality." Nov. 2002. Proceedings of the 2002 ACM on Computer supported cooperative video.*

Eric Foxlin; Michael Harrington, and George Pfiefer. "Constellation(tm): A Wide–Range Wireless Motion–Tracking System for Augmented Reality and Virtual Set Applications." Jul. 1998. Proc. 25th Annual Conf. on Comp. Graphics and Interactive Tech.*

* cited by examiner

Primary Examiner—Jeffery Brier
Assistant Examiner—Eric Woods
(74) Attorney, Agent, or Firm—Westerman, Hattori, Daniels & Adrian, LLP (57) ABSTRACT

An image apparatus and method of the same use a circular marker having two semicircular portions of first and second color areas separated by a center line. An image of a real space including the marker is acquired and an area of the marker is detected from the image. Center coordinates of the marker, for arranging a virtual object in the real space, are calculated based on coordinates of tangents with the area of the marker in a horizontal direction and a vertical direction of the image. Angles of the marker, for arranging the virtual object in the real space, are calculated based on the area of the marker. Then, an image, which has the virtual object arranged in the real space by the position and angles indicated by the marker, is constructed based on the calculation results and shape data of the virtual object.

12 Claims, 10 Drawing Sheets

SZM:d = sb:sL

FIG. 10

IMAGING APPARATUS AND METHOD OF THE SAME

BACKGROUND OF THE INVENTION

1. Field of the Invention

The present invention relates to an imaging apparatus for combining three-dimensionally an image of a virtual object in an image of real space so that the virtual object appears to be located at a predetermined position, angles, etc. in the real space and an imaging method of the same.

2. Description of the Prior Art

Imaging apparatuses combining images of virtual objects with images of real spaces are being used in the fields of architecture, industrial design, fashion, etc. For example, by constructing a model of the interior of a building by computer graphics (CG) and combining images of virtual objects such as furniture, equipment, etc. in the image of a room, the composite image is useful for the design of the layout of the room. In addition, by providing a user with composite images of the user virtually dressed in clothes of different colors, sizes, or styles based on data of the physical build of the user, the user can choose clothes that fit him or her best by referring to the composite images.

Further, by virtually combining images of people, structures, etc. in an architectural design, design of parks or towns, or other images constructed by computer graphics, the composite images provide the designers with concrete working images. Additionally, the composite images can be used as means for evaluating draft designs.

Turning to the problem to be solved by the invention, in the imaging method of the related art and the imaging apparatus constructed based on the method, images of desired virtual objects are combined at predetermined positions in images of real spaces or computer graphic images created based on real spaces as desired by the designers. In this case, it is necessary to obtain or create the images of the real spaces in advance and to input positions of the virtual objects to be combined in those real spaces into the computers etc. in advance. For this reason, it is difficult for a user to freely designate any position in an image of a real space acquired by himself and simply combine an image of a virtual object in the image of the real space so that the virtual object is located there.

SUMMARY OF THE INVENTION

An object of the present invention is to provide an imaging apparatus and method of the same which are able to combine an image of a virtual object in an image of a real space at a predetermined position, angles, etc. and which are able to easily set the position, angles, posture, etc. of the virtual object.

To obtain the above object, according to a first aspect of the present invention, there is provided an imaging apparatus comprising a circular marker, having two semicircular portions of a first color area and a second color area separated by a center line, which indicates the position and angles for arranging an image of a virtual object in an image of a real space, an image acquiring means for acquiring an image of a real space including the marker, a calculating means for detecting the marker area from the image acquired by the image acquiring means and calculating the position and the angles when arranging a virtual object in the real space based on the marker area, and an imaging means for combining an image of the virtual object virtually arranged in the real space by the position and angles indicated by the marker based on the calculation results of the calculating means and the shape data of the virtual object.

According to a second aspect of the present invention, there is provided an imaging method for combining an image of a virtual object in a real space at a position and angles indicated by a marker having two semicircular portions of a first color area and a second color area separated by a center line, comprising the steps of acquiring an image of the real space including the marker; detecting the marker area from the acquired image and calculating the position and angles when the virtual object is arranged in the real space based on the marker area; and combining an image of the virtual object in the real space at a position and angles indicated by the marker based on the calculated position and angles of the marker and the shape data of the virtual object.

According to the present invention, by using a circular marker having two semicircular portions of a first color area and a second color area dyed in different colors separated by a center line, acquiring an image of a real space including the marker, detecting the marker area from the acquired image, and analyzing the detected marker area, the position and size of the marker, the elevation of the image pickup relative to the marker, and the azimuth rotation angle and the rolling angle of the marker are calculated. Based on the calculated results and shape data of the virtual object, a composite image where the virtual object is virtually arranged in the real space at a position, dimensions, and angles indicated by the marker is calculated. Accordingly, an image of a virtual object can be combined three-dimensionally in the image of the real space at a predetermined position, size, and angles.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
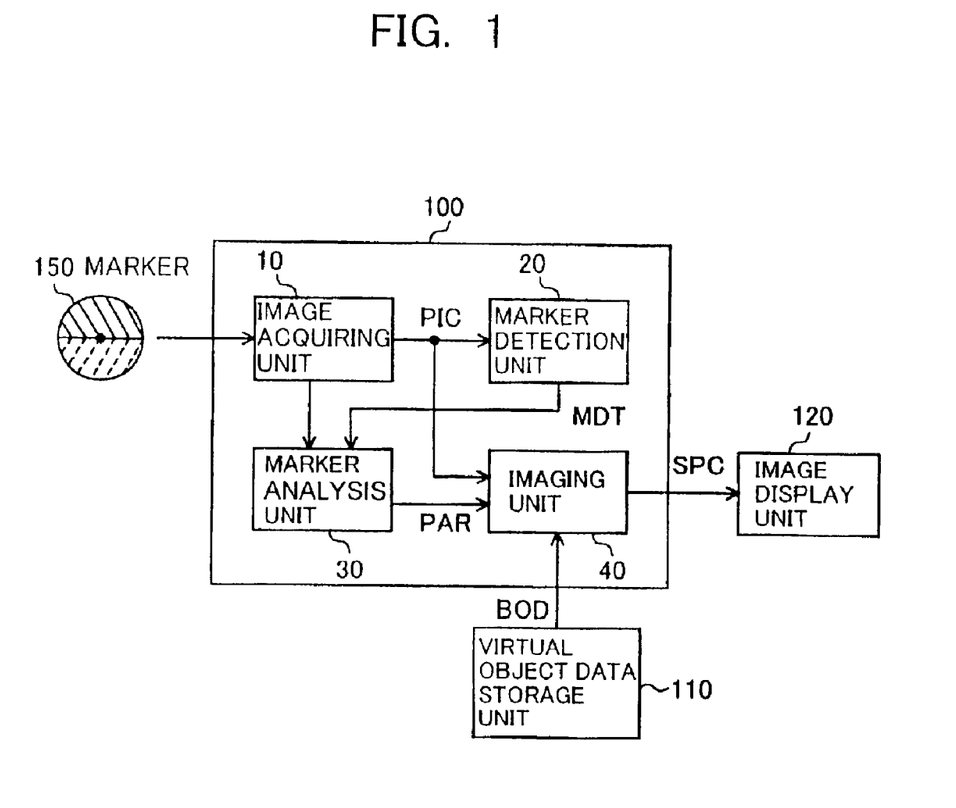
FIG. 1 is a block diagram of the configuration of an imaging apparatus according to an embodiment of the present invention.

FIG. 1 is block diagram of the configuration of an imaging apparatus according to an embodiment of the present invention.

As illustrated, the imaging apparatus 100 of the present invention includes an image acquiring unit 10, a marker detection unit 20, a marker analysis unit 30, and an imaging unit 40. Additionally, as illustrated in FIG. 1, a data storage unit 110 that stores the virtual object data BOD and supplies the same to the imaging unit 40 and an image display unit 120 are provided. Furthermore, a marker 150 that instructs information of the position, posture, etc. when the image of the virtual object is combined with an image of the virtual object in a real space is provided.

Figure 2:
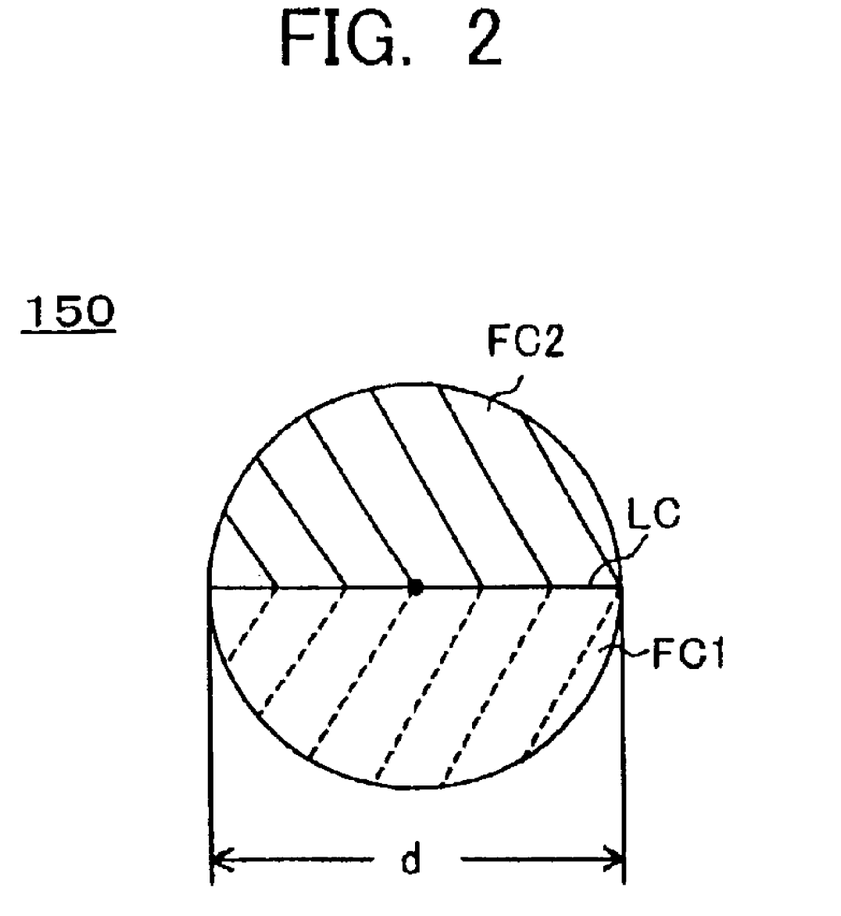
FIG. 2 is view of the configuration of a marker used in the imaging processing of the present embodiment.

FIG. 2 is a view of an example of the marker 150 used in the present embodiment. As shown, the marker 150 used in the present embodiment is a thin circular plate having two areas on its surface. The two areas are separated by a boundary line LC passing through the center of the circle and are dyed by different colors of the color FC1 and the color FC2. Below, these areas are referred to as the color areas FC1 and color area FC2, respectively. The size of the marker is expressed by its diameter d. The diameter d of the marker is set based on the scope of the real space and the size of the virtual object represented by the marker.

For example, when combining an image where furniture and other decor are virtually arranged inside a room in a real space, a marker having a diameter of several centimeters is used based on the size of the furniture. On the other hand, when combining images of stage decor and props in the real space of a stage, it is possible to use a marker of a diameter of tens of centimeters based on the shot position, the distance between the camera and the stage, and the sizes of the decor and props.

Furthermore, it is desirable that the color areas FC1 and FC2 be coated with reflective paint to enable the marker 150 to be clearly picked up by an image pickup, for example, a CCD camera. Additionally, it is desirable to set the colors of the color areas FC1 and FC2 to be different from the background color of the surrounding real space. However, the colors are not limited as long as the marker is easy to be distinguished from the image of the real space acquired by the CCD camera. Further, it is possible to prepare several markers of different combinations of colors and use a marker having a combination of colors easily detected from the image of the real space based on the background color of the real space to be picked up.

In the present embodiment, the virtual object data storage unit 110 and the image display unit 120 can be built into the imaging apparatus 100. That is, the virtual object data storage unit 110 and the image display unit 120 can be made components of the imaging apparatus 100.

The imaging apparatus 100 shown in FIG. 1 is an example of the basic configuration for realizing the concept of the present invention. Various modifications may also be considered. For example, the virtual object data storage unit 110 can also be mounted in a server which provides information of the virtual object through a data communications network to the imaging apparatus 100. Further, in addition to the image display unit 120, it is possible to provide an image recording unit that records the composite images SPC and provides the recorded composite images when needed.

Next, each component of the imaging apparatus 100 of the present embodiment will be explained.

The image acquiring unit 10 fetches digital images of a real space including a marker into the imaging apparatus 100. The image acquiring unit 10 is formed by, for example, a CCD camera. Note that in the imaging apparatus 100 of the present embodiment, the image acquiring unit 10 is not limited to an image pickup. For example, the image acquiring unit 10 may also be formed by an image recording means that records image signals acquired in advance and reads out the recorded image signals when needed like a video tape recorder (VTR), a CD-ROM or DVD-ROM player, etc. Furthermore, it can store image data acquired from a server. Therefore, the imaging apparatus 100 can fetch image data from a server through a data communications network. In this case, the image acquiring unit 10 can be considered to be formed by a network interface. In addition, another example is a complex type image acquiring unit with a combination of various of the above functions. That is, the image acquiring unit 10 can have a plurality of the functions of pickup, recording, and reproduction of image data and the function of a network interface too.

The marker detection unit 20 detects the image area of the marker from the image data PIC acquired by the image acquiring unit 10 and outputs marker area information MDT. The marker is detected by pattern matching or another detection method. As described above, the marker 150 is circular and is divided into two semicircular areas by a center line. The two divided semicircular areas are colored differently. The marker detection unit 20 detects the image area of the marker from the image data PIC based on known information relating to the marker 150 and provides the marker area information MDT to the marker analysis unit 30.

The marker analysis unit 30 calculates the parameters PAR of the position and angles of the marker in the real space and the distance between the marker and the image pickup based on the marker area information MDT. The processing in the marker analysis unit 30 will be explained concretely later.

The imaging unit 40 constructs an image where a virtual object is virtually arranged at a position in a real space by a position and angles indicated by the marker 150 based on the position and angles of the marker and the distance between the marker and the image pickup calculated by the marker analysis unit 30 and further based on the image data PIC of real space acquired by the image acquiring unit 10 and the data BOD relating to the shape of the virtual object acquired from the virtual object data storage unit 110. Then the composite image SPC is output to the outside.

The virtual object data storage unit 110 stores data expressing a three-dimensional shape and properties of a virtual object constructed in a real space, that is, data of quantized information such as the dimensions, color of the surface, and feel of the virtual object in a three-dimensional space.

As described above, in the present embodiment, the virtual object data storage unit 110 can be provided inside the imaging apparatus 100. In addition, for example, the virtual object data storage unit 110 can be provided in a server provided at a separate location. In this case, the server provides the three-dimensional data of the virtual object via a data communications network. When constructing an image, the imaging apparatus 100 fetches the three-dimensional data of a virtual object from the server via the data communications network.

The image display unit 120 displays an image including the virtual object constructed by the imaging unit 40. In FIG. 1, the image display unit 120 is provided separately from the imaging apparatus 100, but in the present embodiment, the configuration is not limited to this. The image display unit 120 can be provided as part of the imaging apparatus 100.

Figure 3:
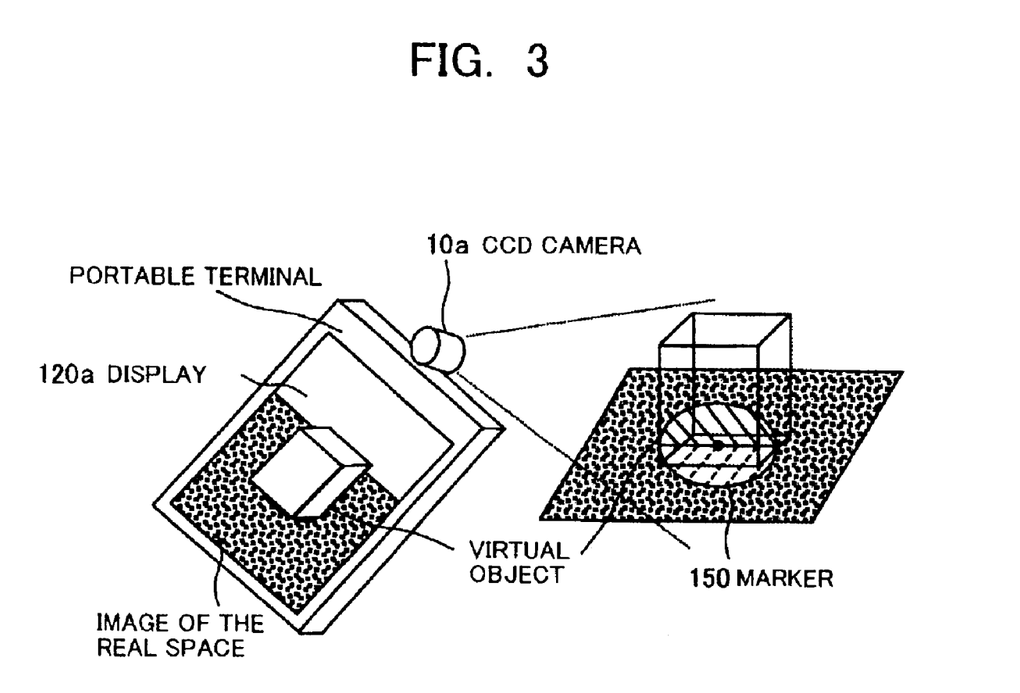
FIG. 3 is a conceptual view of an example of the imaging apparatus of the present embodiment applied to a small portable terminal.

FIG. 3 is a view of an example of application of the imaging apparatus 100 of the present embodiment to a small portable terminal (portable computer).

As illustrated, the portable terminal is provided with a small CCD image pickup (CCD camera) 10a and display 120a. The CCD camera 10a corresponds to the image acquiring unit 10 in FIG. 1, while the display 120a corresponds to the image display unit 120 shown in FIG. 1.

The CCD camera 10a inputs an image of the real space including the marker 150 into the portable terminal. Then, the portable terminal calculates the position and is angles of the virtual object based on the acquired image, generates an image of the virtual object in accordance with the results of calculation, and embeds the created image of the virtual object in the image of the real space to generate the composite image. Accordingly, as illustrated in FIG. 3, the display 120a of the portable terminal displays a composite image where the virtual object is arranged at the position and angles indicated by the marker.

In the portable terminal shown in FIG. 3, the CPU or built-in signal processor realize the functions of the marker detection unit 20, the marker analysis unit 30, and the imaging unit 40 of the imaging apparatus of FIG. 1. In addition, the three-dimensional data of the virtual object used for constructing the image can be stored in the memory of the portable terminal in advance or fetched from a server via a data communications network, for example, a wireless LAN, when constructing an image. In the former case, the memory of the portable terminal corresponds to the virtual object data storage unit 110 shown in FIG. 1, while in the latter case, the server providing the data of the virtual object corresponds to the virtual object data storage unit shown 110 in FIG. 1.

Next, the detection of the marker and the calculation of parameters of the location etc. of the virtual object indicated by the marker image in the imaging apparatus of the present embodiment will be explained in detail.

In the imaging apparatus 100 of the present embodiment, the information necessary for combining the image of the virtual object and the image of the real space consists of the position of the virtual object in the real space, the size of the image of the virtual object to be embedded in the image of the real space, and the posture of the virtual object, namely, the rotation angles of the virtual object in a three-dimensional coordinate system. When these information are determined, an image of the virtual object can be combined with the image of the real space acquired by the CCD camera 10a.

The position of the virtual object is set by the center coordinates of the marker area. The size of the virtual object is set in proportion to the size of the image of the marker. The posture of the virtual object is set in accordance with the angles of arrangement of the marker. Accordingly, by analyzing the image of the real space including the marker, the parameters for combining the image of the virtual object with the image of the real space can be calculated.

Figure 4:
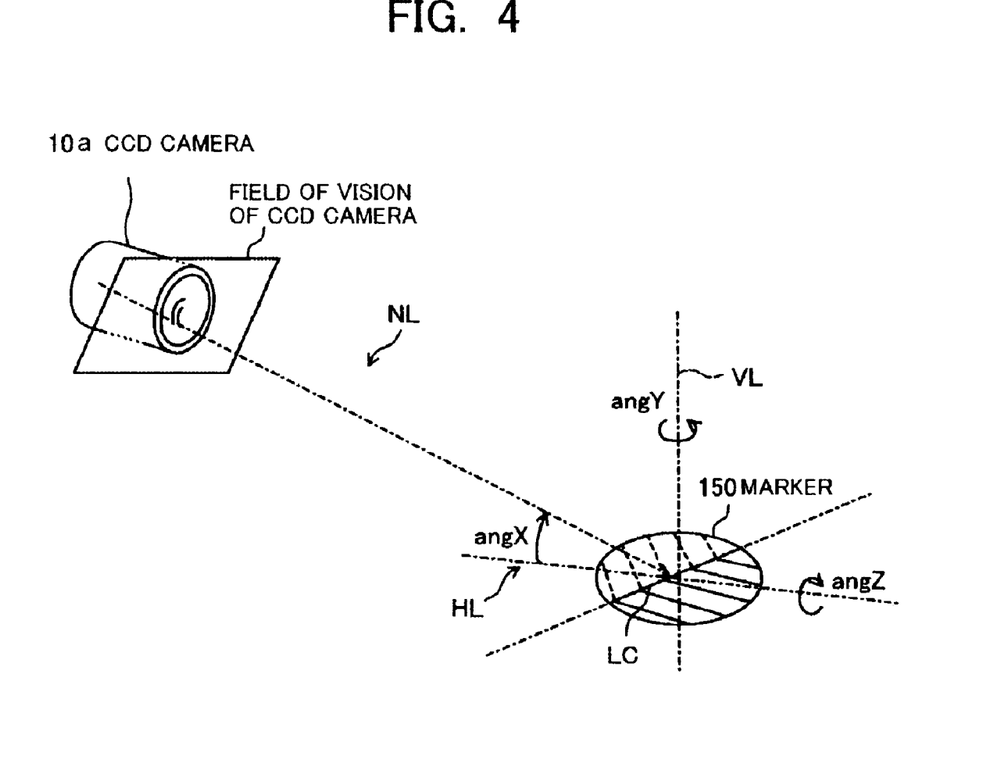
FIG. 4 is a view of the relative positions of the image pickup and the marker in a three-dimensional coordinate system.

FIG. 4 is a view of the relative positions of the CCD camera 10a and the marker 150 in a three-dimensional coordinate system. As illustrated, there are three parameters of an elevation angX and rotation angles angY and angZ relating to the posture of the marker 150.

The elevation angX is the angle formed by a line NL connecting the center of the,lens of the CCD camera and the center of the marker and the horizontal plane. When the CCD camera 10a picks up an image from right above the marker, that is, when the elevation angX is n/2, the image of the marker in the field of vision of the CCD camera is a circle. When the elevation angX is other than n/2, the image of the marker in the field of vision of the CCD camera becomes an ellipse.

That is, in accordance with the change of the elevation angX, the ratio of the major axis and the minor axis of the image of the marker acquired by the CCD camera changes. The image analysis unit 30 of the present embodiment calculates the major axis and the minor axis of the image of the marker and calculates the elevation angX accordingly.

The rotation angle angY is the angle of rotation of the marker about the vertical line VL shown in the figure. Here, for example, assuming that the boundary line LC of the marker crosses the line NL at a right angle, the rotation angle angY is defined as 0 degree if the color area FC1 is at the near side and the color area FC2 is at the far side when viewing the marker from the CCD camera 10a. Note that the boundary line LC crosses the line NL at a right angle, but when viewing the marker from the CCD camera 10a, the color area FC2 is at the near side while the color area FC1 is at the far side, the rotation angle angY is defined as n. The marker analysis unit 30 calculates the rotation angle angY based on this definition.

The rotation angle angZ is the angle of rotation of the marker about the line HL, that is, the projection of the line NL at the horizontal plane. Here, using as reference the rotation angle angZ, for example, the rotation angle angZ is defined to be 0 degree when the major axis of the image of the marker 150 in the field of vision of the CCD camera is identical to the horizontal direction. When the marker 150 rotates about the horizontal line HL, the direction of the major axis of the marker 150 changes, so that in analysis of the marker, the angle formed by the major axis and the horizontal direction of the image is calculated as the rotation angle angZ.

Note that in the explanation below, the rotation angle angY of the marker 150 is referred to as the azimuth angle or azimuth rotation angle and the rotation angle angZ is referred to as the rolling rotation angle.

Next, the processing for calculating the position, distance, and posture of the marker in the marker analysis unit 30 will be explained.

Figure 5:
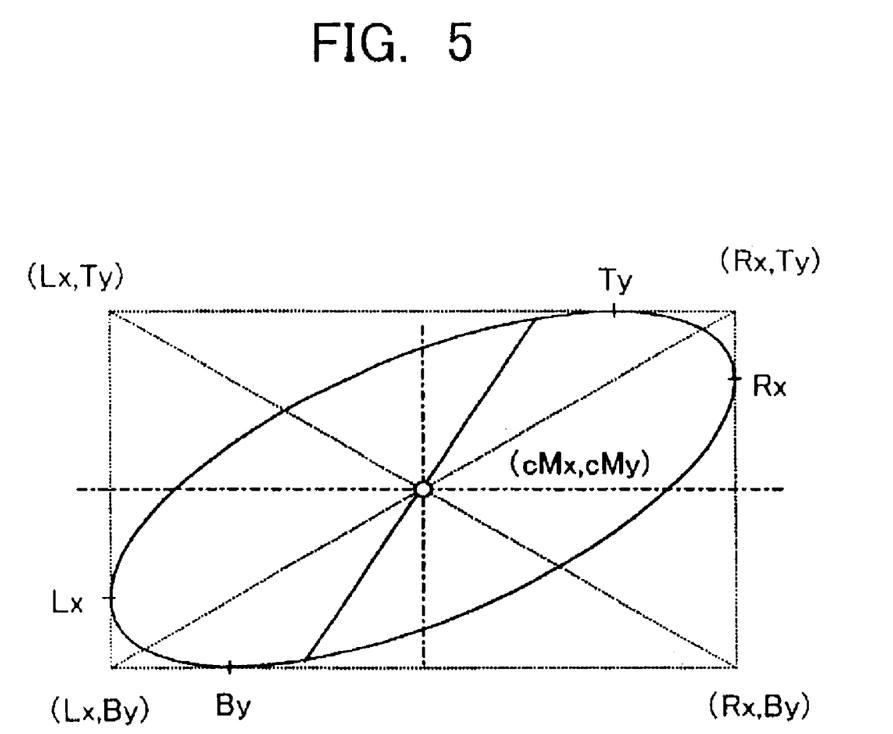
FIG. 5 is a view of processing for finding the center coordinates of the marker.

First, FIG. 5 is a view of processing for finding the center coordinates (cMx, cMy) of the marker. As illustrated, here, assuming that the x-axis is the horizontal direction on the screen of the display and the y-axis is the vertical direction, in an image of a real space including the marker, the y-coordinates and x-coordinates of the horizontal lines and vertical lines circumscribing the marker area of the image of the marker in the horizontal direction and vertical direction are detected.

For example, assuming that at the left side of the marker, the x-coordinate of the point of contact of the vertical line and marker area is Lx, at the right side of the marker, the x-coordinate of the point of contact of the vertical line and the marker area is Rx, at the top of the marker, the y-coordinate of the point of contact of the horizontal line and the marker area is Ty, and at the bottom of the marker, the y-coordinate of the point of contact of the horizontal line and the marker area is By, the coordinates of the vertexes of the rectangle formed by the tangential lines become (Lx, Ty), (Lx, By), (Rx, Ty), and (Rx, By).

Thus, the center coordinates of the marker (cMx, cMy) can be calculated based on the coordinates of the detected points of contact by the following equation:

$$cMx=(Lx+Rx)/2$$

$$cMy=(Ty+By)/2 \quad (1)$$

According to equations 1, the center coordinates of the marker (cMx, cMy) are calculated. The center coordinates serve as the reference position when arranging the virtual object in a real space. Then, the major axis and the minor axis of the marker area and the size szM of the marker are calculated as follows with reference to the center coordinates calculated (cMx, CMy):

The distance Len from the center coordinates of the marker (cMx, cMy) to any point (pLx, pLy) on the circumference of the market area is found as follows:

$$Len=((pLx-cMx)^2+(pLy-cMy)^2)^{1/2} \quad (2)$$

The distances from all points sampled at predetermined intervals on the circumference of the market area to the center coordinates (cMx, cMy) are calculated according to equation 2. The length of 2 times the maximum distance is designated as the major axis LenL, while the length of 2 times the minimum distance is designated as the minor axis LenS. That is, the major axis and the minor axis of the marker area are calculated as follows:

$$LenL=2\max(Len)$$
$$LenS=2\min(Len) \quad (3)$$

In equation 3, max(Len) and min(Len) are the maximum and the minimum values of the Len calculated by equation 2.

In the present embodiment, since a circular marker 150 is used, even if the rotation angles of the marker and the rotation angles or elevation of the camera change, the major axis of the marker area will not change. The major axis LenL changes only due to the distance between the CCD camera 10a and the marker 150, thus the size of the marker szM is determined by the major axis LenL.

The marker analysis unit 30 of the present embodiment calculates the center coordinates of the marker (cMx, cMy), the major axis LenL, the minor axis LenS, and the size szM of the marker according to the processing described above.

Figure 6:
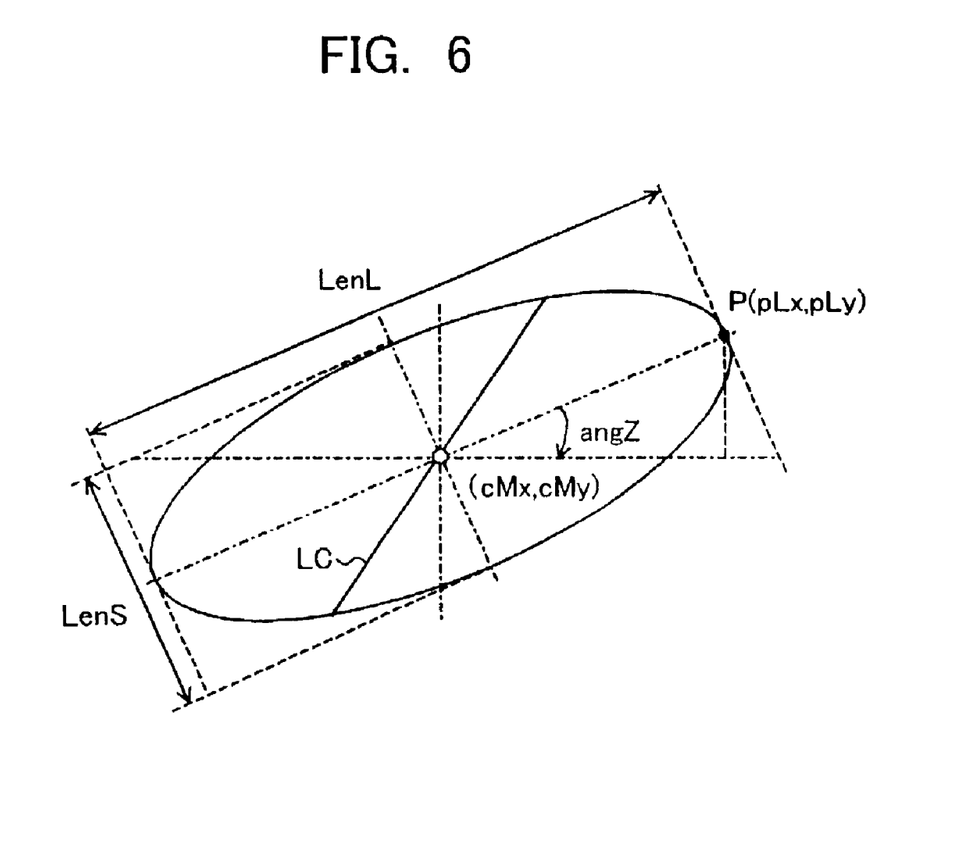
FIG. 6 is a view of processing for finding the elevation of an image pickup relative to the marker.

FIG. 6 is a view of the processing for finding the rolling rotation angle angZ of the marker 150. Below, the processing for calculating the rolling rotation angle angZ of the marker 150 will be explained with reference to FIG. 6.

The rolling rotation angle angZ is the rotation angle of the marker 150 rotated about the horizontal line HL that passes through the center coordinates (cMx, cMy) of the marker 150 on the plane of the marker 150 shown in FIG. 2. As illustrated in FIG. 6, in the image picked up by the CCD camera 10a, the rolling rotation angle angZ is calculated by measuring the coordinates of the point P (pLx, pLy) of the marker area in the direction of the major axis and calculating the angle according to the following equation based on the coordinates (pLx, pLy) of the point P and the center coordinates (cMx, cMy) of the marker 150:

$$angZ=\arctan((pLy-cMy)/(pLx-cMx)) \quad (4)$$

Namely, as illustrated in FIG. 6, the rolling rotation angle angZ of the marker 150 is the angle formed by the major axis LenL of the marker area and the horizontal plane.

Figure 7:
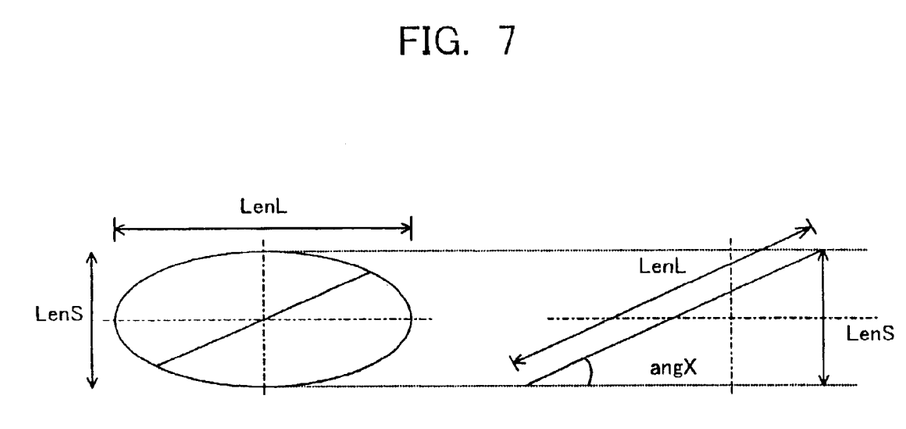
FIG. 7 is a view of processing for finding the elevation angle of the image pickup relative to the marker.

FIG. 7 is a view of processing for calculating the elevation angX of the CCD camera relative to the marker 150.

As illustrated in FIG. 7, the elevation angX can be calculated based on the major axis LenL and the minor axis LenS found based on the marker area according to the following equation:

$$angX=\arcsin(LenS/LenL) \quad (5)$$

Figure 8:
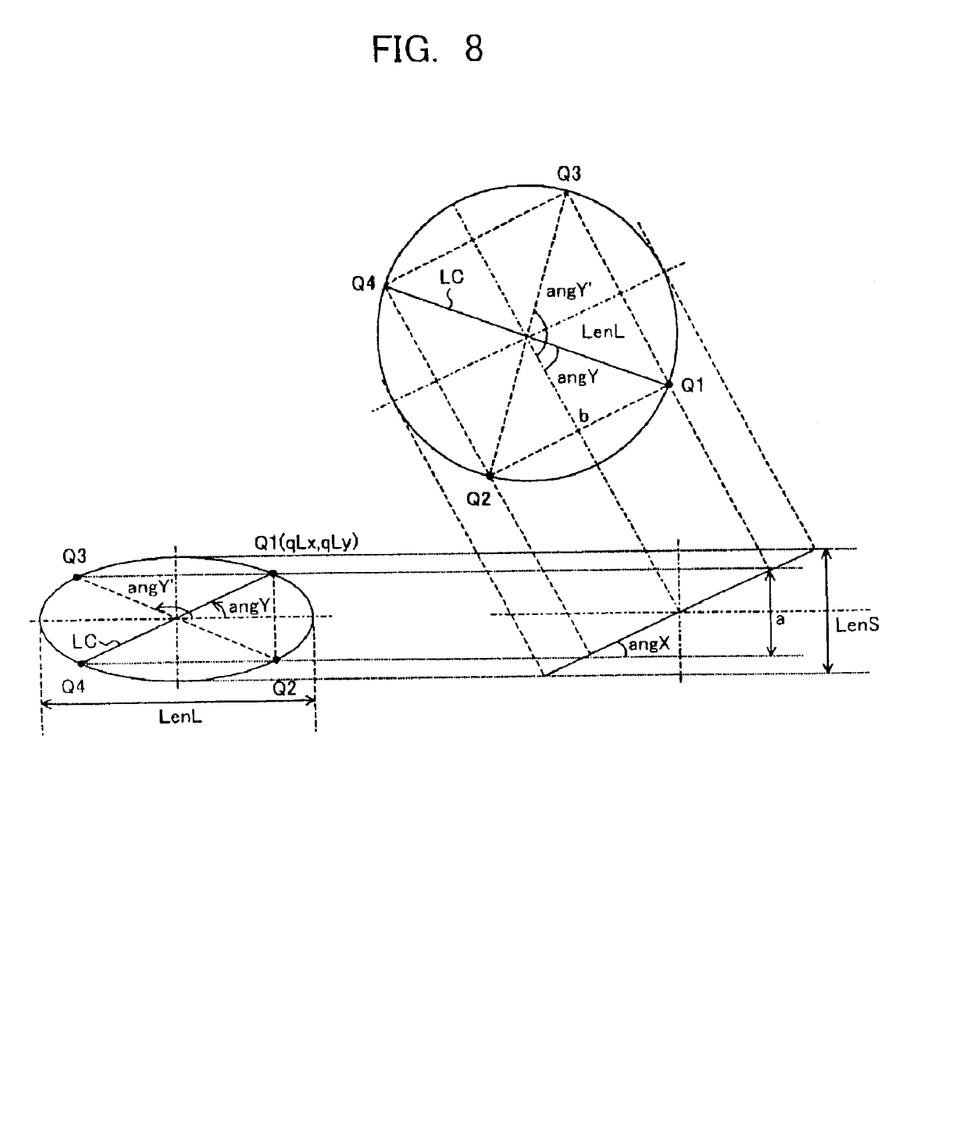
FIG. 8 is a view of processing for finding the azimuth rotation angle (azimuth angle) of the marker.

Next, FIG. 8 is a view of processing for calculating the azimuth rotation angle angY of the marker 150.

As illustrated in FIG. 8, the azimuth angle angY is a rotation angle of the marker rotated about the vertical line VL shown in FIG. 4.

For finding the azimuth rotation angle angY, as shown in FIG. 8, a vertical line is drawn from the intersection Q1 (qLx, qLy) of the boundary line LC and the circumference of the marker 150 toward the major axis of the marker 150 to obtain the intersection Q2 between the vertical line and the circumference of the marker 150. Assuming that the distance of Q1 and Q2 is b, the azimuth rotation angle angY can be calculated by the following equation:

$$angY=\arcsin(b/LenL) \quad (6)$$

As illustrated in FIG. 8, the distance b between the points Q1 and Q2 becomes a length a in the actually picked up image. Here, the lengths a and b and the elevation angX satisfy the following relation:

$$b=a/\sin(angX) \quad (7)$$

By entering equation 7 into equation 6, the following equation is obtained:

$$angY=\arcsin(a/\sin(angX)LenL) \quad (8)$$

According to equation 5, sin(angX)LenL=LenS, so equation 8 can be written as follows:

$$angY=\arcsin(a/LenS) \quad (9)$$

That is, by calculating the distance a between the points Q1 and Q2 in the picked up marker area, the azimuth angle angY of the marker 150 is according to equation 9 based on the distance a and the already detected minor axis LenS.

Note that the azimuth angle angY found by equation 9 is further corrected in accordance with the relative position with the intersection Q1 (qLx, qLy) of the boundary line LC and the circumference of the marker 150. For example, when the intersection of the boundary line LC and the circumference of the marker 150 shown in FIG. 8 is the point Q1, the azimuth angle angY calculated according to equation 9 is made the azimuth angle of the marker 150 as it is, while when the intersection of the boundary line LC and the circumference of the marker 150 is the point Q3 as shown in FIG. 8, the azimuth angle angY of the marker 150 calculated according to equation 9 must be corrected. Namely, the azimuth angle angY' at this time is n−angY.

The above correction is performed based on the coordinates (qLx, qLy) of the intersection point Q1 and the center coordinates (cMx, cMy) of the marker. Whether correction is performed is judged based on the following relations:

if $(qLx-cMx)(qLy-cMy)>0$, no correction is performed.

if $(qLx-cMx)(qLy-cMy)<0$, n−angY is used (10)

The azimuth angle angY of the marker 150 calculated above is further corrected in accordance with the positions of the color areas FC1 and FC2 of the marker 150. For example, if the state where the color area FC1 is at the front side, that is, at the near side when viewed from the CCD camera 10a, and the color area FC2 is at the far side is designated as the front state, while the state where the color area FC2 is at the near side and the color area FC1 is at the far side is designated as the back state, when at the front state, the azimuth angle angY or n−angY calculated according to equation 9 or 10 is used as the azimuth angle of the marker 150. On the other hand, when at the back state, the azimuth angle calculated according to equation 9 or 10 is corrected further by adding n.

In the imaging apparatus of the present embodiment, the marker detection unit 20 detects the marker 150 from the image picked up by the CCD camera 10$a$, then the marker analysis unit 30 calculates the center coordinates (cMx, cMy), the major axis LenL, and the minor axis LenS of the marker 150 in accordance with the detected marker area. Additionally, by performing the processing of equations 1 to 9, the elevation angX of the CCD camera relative to the marker 150 and the azimuth rotation angle angY and the rolling rotation angle angX of the marker 150 are calculated. Then, the parameters are provided from the marker analysis unit 30 to the imaging unit 40. The imaging unit 40 calculates the image of the virtual object and superposes it on the image of the real space based on the three-dimensional data of the virtual object and the parameters calculated by the marker analysis unit 30.

Figure 9:
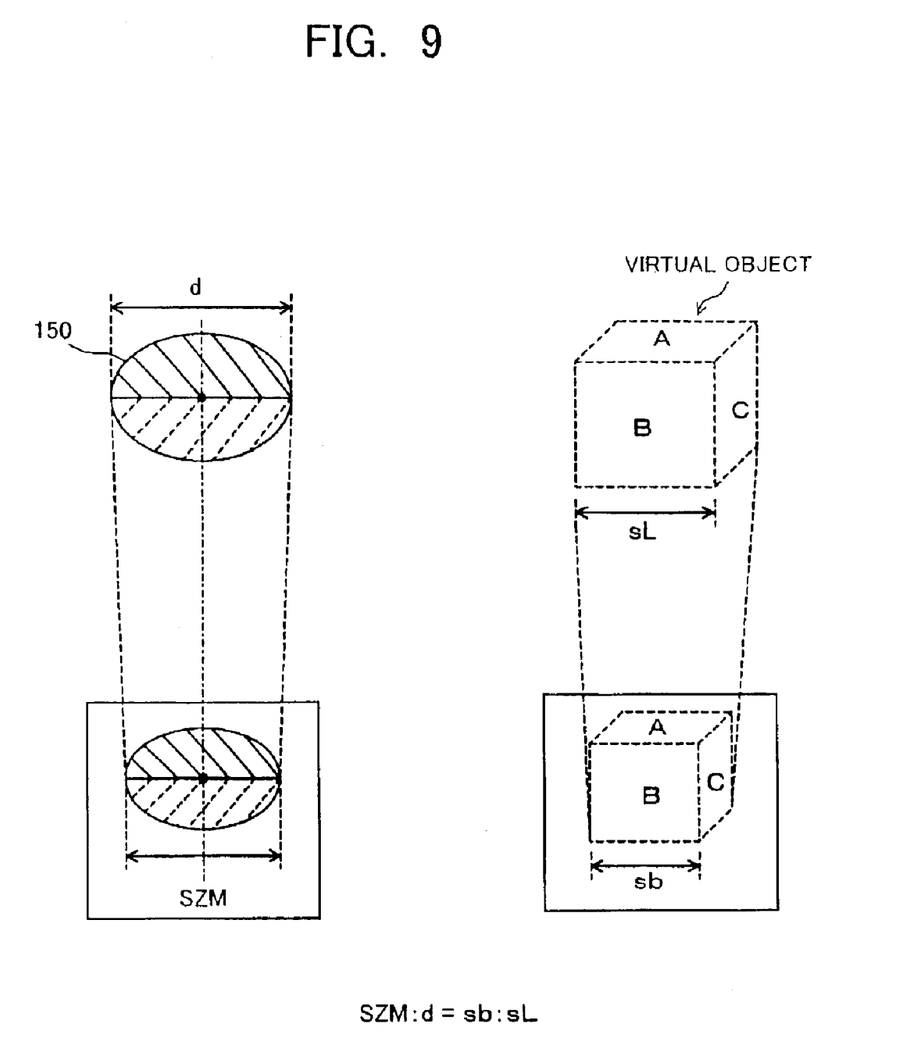
FIG. 9 is a view of processing for finding the size of an image of a virtual object when combined.

FIG. 9 is a view of processing for finding the size of the virtual object combined with the image of the real space in the imaging apparatus of the present embodiment.

The size of the marker area in the image picked up by the CCD camera 10$a$ (refer to FIG. 3) varies according to the distance between the CCD camera 10$a$ and the marker 150. In the present embodiment, the size of the virtual object combined with the image of the real space is determined in accordance with the size of the marker area.

As shown in FIG. 9, the size szM of the marker 150 picked up by the CCD camera 10$a$ is found by the marker detection unit 30. Specifically, the size szM of the marker area picked up by the CCD camera 10$a$ relative to a marker having a diameter d is determined by the major axis LenL of the marker area, that is, szM=LenL.

Here, assuming that the virtual dimensions of the virtual object to be combined with the image of the real space is sL, when the virtual object is combined with the image of the real space, the dimension sb on the screen corresponding to the virtual dimension sL can be found based on the proportional relationship with the dimensions of the marker 150 according to the following equation:

$$szM:d=sb:sL$$

$$sb=szM*sL/d \quad (11)$$

According to equation 11, when combining the virtual object with the image of the real space, the dimensions sb displayed in the image can be calculated. Using the calculated dimensions sb as a reference, along with the three-dimensional data of the virtual object and parameters of the rotation angles showing the posture of the virtual object in the real space, the image of the virtual object can be calculated and superposed on the image of the real space.

In the imaging apparatus of the present embodiment, the marker analysis unit 30 can calculate the position and the elevation, rotation angles, etc. showing the posture of the marker in the real space by the above processing based on the image of the detected marker 150. On the other hand, when the resolution of the image obtained by the image pickup is low, there is the drawback that the precision of the processing may deteriorate. At this time, based on the detected marker area, it is possible to hypothesize an estimated marker closest to the image of the picked up marker 150 by pattern matching, the least square method, etc. based on the detected marker area and possible to calculate the elevation, the azimuth angle, and the rolling rotation angle of the estimated marker so as to give the smallest difference between the estimated marker area and the picked up marker area and use these as the parameters of the market 150.

Accordingly, the error of the estimation of the position, size, and angles can be reduced, and the precision of the composite image can be improved.

Figure 10:
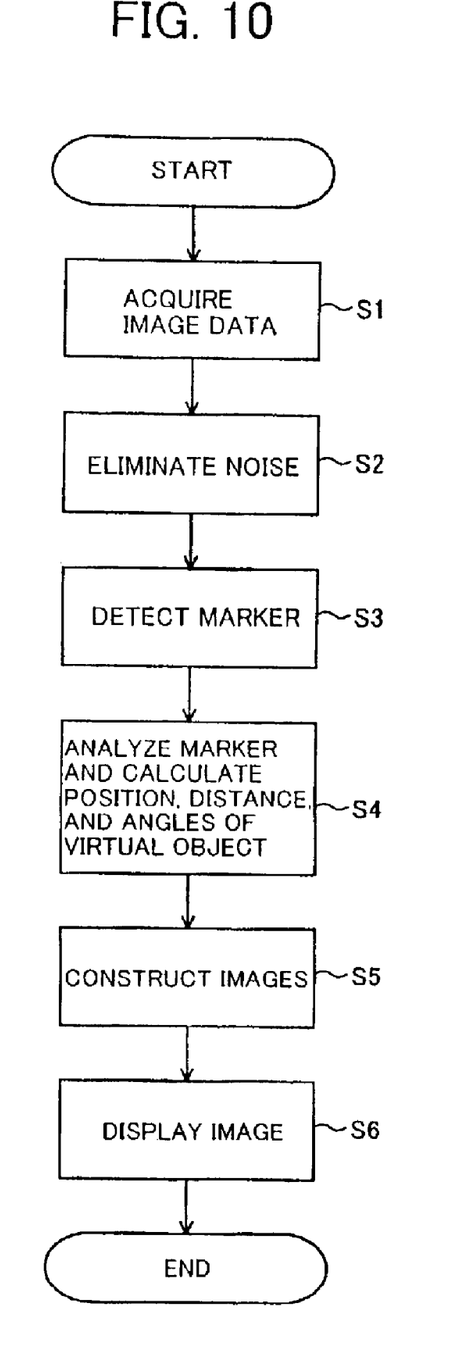
FIG. 10 is a flow chart of imaging processing for combining an image of a virtual object in an image of a real space.

FIG. 10 is a flow chart of the overall processing of imaging in the imaging apparatus of the present embodiment. Below, the operation of the imaging in the present embodiment will be explained with reference to the flow chart shown in FIG. 10.

First, at step S1, the image data of the real space including the marker 150 is acquired. Here, the image data can be any of the real time image data acquired by the CCD camera 10$a$, the image data read from a recording device recording image data acquired in advance, or image data acquired from a server providing image data via the data communications network.

Next, at step S2, processing is performed for eliminating noise from the image data. The image data acquired by the image pickup, for example, the CCD camera 10$a$, includes noise which may reduce the precision of detection of the marker area. Therefore, in order to improve the precision of detection of the marker area, it is desirable that the processing for elimination of noise be carried out before the marker detection. Here, the noise can be removed by filtering using a low-pass filter to remove the high frequency components included in large quantities in noise.

At step S3, the marker is detected from the image data after noise elimination. The marker is detected by the marker detection unit 20 in the imaging apparatus. For example, the marker area is extracted from a frame of image data by pattern matching or another method.

Next, at step S4, the marker analysis unit 30 analyzes the marker. As a result of the marker analysis, the position of the marker, namely the center coordinates (cMx, cMy) of the marker, the size sb of the virtual object, and the elevation angX, the azimuth rotation angle angY, and the rolling rotation angle angZ relating to the posture of the marker are calculated.

Then, at step S5, the imaging is performed. The imaging unit 40 calculates the image of the virtual object based on the parameters calculated by the marker analysis unit 30 and the three dimensional data of the virtual object. Then, it superposes the calculated image of the virtual object on the image of the real space.

By steps S1 to S5 described above, the image of the virtual object is combined with the image of the real space. Then, at step S6, the composite image is displayed by the display device.

As described above, the imaging apparatus of the present embodiment uses the marker 150 to instruct the position, the angles, etc. of the virtual object arranged in real space, picks up the image of the real space including the image of the marker 150 by the CCD camera 10$a$ or other image pickup, extracts the marker area from the acquired image, calculates the position of the virtual object arranged in a real space and the rotation angles, elevation, etc. representing the posture of the virtual object based on the extracted marker area, calculates the image of the virtual object based on the calculated parameters and the three-dimensional data of the virtual object, and superposes it on the image of the real space, so can construct an image of a virtual object at a desired position and posture in an image of a real space.

Summarizing the effects of the invention, as described above, according to the imaging apparatus and the method of the same, by using the marker, it becomes easy to instruct the parameters such as the position and the rotation angles representing the posture when virtually arranging a virtual object in a real space. It is also possible to extract the marker area from the image of the real space including the marker, analyze the position, the rotation angle, the elevation, etc. of the marker from the extracted marker area, and prepare the composite image of the virtual object using the three-dimensional data of the virtual object in accordance with the result of the analysis. Then, by superposing the created image of the virtual object on the image of the real space, a composite image of the image of the virtual object combined with image of the real space is obtained.

Further, according to the present invention, since instructions of the position and posture of the virtual object become easy using the marker and the extraction and analysis of the marker can be realized based on known image processing technology, there is the advantage that a desired composite image of a virtual object arranged in real space can be created in real time while keeping down the processing load of the imaging apparatus.

While the invention has been described with reference to specific embodiments chosen for purpose of illustration, it should be apparent that numerous modifications could be made thereto by those skilled in the art without departing from the basic concept and scope of the invention.

What is claimed is:

1. An imaging apparatus comprising:
   a circular marker, having two semicircular portions of a first color area and a second color area separated by a center line, which indicates a position and angles for arranging an image of a virtual object in an image of a real space,
   an image acquiring means for acquiring an image of a real space including the marker;
   a calculating means for detecting an area of the marker from the image acquired by the image acquiring means, calculating center coordinates of the marker based on coordinates of tangents with the area of the marker in a horizontal direction and a vertical direction of the image acquired by the image acquiring means and calculating angles of the marker, when arranging a virtual object in the real space based on the area of the marker; and
   an imaging means for constructing an image of the virtual object virtually arranged in the real space by the position and the angles indicated by the marker based on the calculation results of the calculating means and the shape data of the virtual object.

2. An imaging apparatus according to claim 1, wherein the calculating means calculates distances from the center coordinates of the marker to the circumference of the marker area and calculates a major axis and a minor axis of the marker area according to the maximum value and the minimum value of the distances.

3. An imaging apparatus according to claim 2, wherein the calculating means calculates the elevation of an image pickup picking up the image relative to the marker based on the lengths of the major axis and the minor axis of the marker area calculated.

4. An imaging apparatus according to claim 2, wherein the calculating means calculates a rolling rotation angle of the marker based on an angle formed by the direction of the major axis of the marker area and the horizontal direction of the image acquired.

5. An imaging apparatus according to claim 2, wherein the calculating means calculates an azimuth rotation angle of the marker based on a length of a line vertical to the major axis of the marker area from an intersection of a boundary line of the marker with a circumference of the marker area and a length of the minor axis of the marker area.

6. An imaging apparatus according to claim 5, wherein the calculating means correct the calculated azimuth rotation angle of the marker based on the positions of the first and the second color areas of the marker area.

7. An imaging apparatus according to claim 2, wherein the calculating means calculates the size of a composite image of the virtual object based on a ratio of a diameter of the marker and the major axis of the marker area.

8. An imaging apparatus according to claim 1, wherein the image acquiring means is formed by an image pickup picking up an image of the real space including the marker.

9. An imaging apparatus according to claim 1, wherein the image acquiring means is formed by an image reproduction device reading out the image from a storage medium storing the image of a real space including the marker.

10. An imaging apparatus according to claim 1, further comprising a data storage unit that stores the shape data of the virtual object, wherein the imaging means obtains the shape data of the virtual object from the data storage unit.

11. An imaging apparatus according to claim 1, wherein the imaging means obtains shape data of the virtual object from a server providing the shape data of the virtual object via a data communications network.

12. An imaging method constructing an image of a virtual object arranged in a real space at a position and angles indicated by a marker having two semicircular portions of a first color area and a second color area separated by a center line, comprising the steps of:
    acquiring an image of the real space including the marker;
    detecting the marker area from the acquired image and calculating center coordinates of the marker based on coordinates of tangents with the area of the marker in a horizontal direction and a vertical direction of the image acquired by the image acquiring means and calculating angles of the marker, when the virtual object is arranged in the real space based on the marker area; and
    constructing an image of the virtual object arranged in the real space at a position and angles indicated by the marker based on the calculated position and angles of the marker and the shape data of the virtual object.

* * * * *